United States Patent [19]
Wilson et al.

[11] Patent Number: 6,037,072
[45] Date of Patent: Mar. 14, 2000

[54] FUEL CELL WITH METAL SCREEN FLOW FIELD

[75] Inventors: Mahlon S. Wilson; Christine Zawodzinski, both of Los Alamos, N. Mex.

[73] Assignee: Regents of the University of California, Los Alamos, N. Mex.

[21] Appl. No.: 09/105,747

[22] Filed: Jun. 26, 1998

Related U.S. Application Data

[62] Division of application No. 08/873,049, Jun. 11, 1997, Pat. No. 5,798,187
[60] Provisional application No. 60/027,489, Sep. 27, 1996.

[51] Int. Cl.$^7$ ................................................ H01M 8/10
[52] U.S. Cl. ................................................ 429/33; 429/30
[58] Field of Search ............................ 429/32, 30, 210, 429/33

[56] References Cited

U.S. PATENT DOCUMENTS

| | | | |
|---|---|---|---|
| 3,963,519 | 6/1976 | Louie | 136/86 A |
| 4,855,193 | 8/1989 | McElroy | 429/30 |
| 5,049,458 | 9/1991 | Sato et al. | 429/32 |
| 5,145,752 | 9/1992 | Goldstein et al. | 429/27 |
| 5,268,241 | 12/1993 | Meacham | 429/35 |
| 5,482,792 | 1/1996 | Faita et al. | 429/30 |

OTHER PUBLICATIONS

Mahlon Wilson, Christine Zawodzinski, Shimshon Gottesfeld, and Albert R. Landgrebe, "Stationary Power Applications for Polymer Electrolyte Fuel Cells," Proceedings of the 11$^{th}$ Annual Battery Conference, Jan. 9–12, Long Beach, CA, 1996.

Shimshon Gottesfeld, Gerald Halpert, and Albert Landgrebe, "Proton Conducting Membrane Fuel Cells I," Proceedings of the First International Symposium on Proton Conducting Membrane Fuel Cells, Pennington, NJ. (No Date).

*Primary Examiner*—John S. Maples
*Attorney, Agent, or Firm*—Ray G. Wilson

[57] ABSTRACT

A polymer electrolyte membrane (PEM) fuel cell is provided with electrodes supplied with a reactant on each side of a catalyzed membrane assembly (CMA). The fuel cell includes a metal mesh defining a rectangular flow-field pattern having an inlet at a first corner and an outlet at a second corner located on a diagonal from the first corner, wherein all flow paths from the inlet to the outlet through the square flow field pattern are equivalent to uniformly distribute the reactant over the CMA. In a preferred form of metal mesh, a square weave screen forms the flow-field pattern. In a particular characterization of the present invention, a bipolar plate electrically connects adjacent fuel cells, where the bipolar plate includes a thin metal foil having an anode side and a cathode side; a first metal mesh on the anode side of the thin metal foil; and a second metal mesh on the cathode side of the thin metal foil. In another characterization of the present invention, a cooling plate assembly cools adjacent fuel cells, where the cooling plate assembly includes an anode electrode and a cathode electrode formed of thin conducting foils; and a metal mesh flow field therebetween for distributing cooling water flow over the electrodes to remove heat generated by the fuel cells.

3 Claims, 8 Drawing Sheets

FUEL CELL WITH METAL SCREEN FLOW FIELD

This application is a Division of Ser. No. 08/873,049 filed Jun. 11, 1997 U.S. Pat. No. 5,798,187 and also claims the benefit of U.S. Provisional Application Ser. No. 60/027,489, filed Sep. 27, 1996.

BACKGROUND OF THE INVENTION

This invention relates to electrochemical fuel cells, and, more particularly, to polymer electrolyte membrane fuel cells. This invention was made with government support under Contract No. W-7405-ENG-36 awarded by the U.S. Department of Energy. The government has certain rights in the invention.

The fuel cell converts chemical energy to electrical power with virtually no environmental emissions. A fuel cell differs from a battery in that it derives its energy from supplied fuel, as opposed to energy stored in the electrodes in the battery. Because a fuel cell is not tied to a charge/discharge cycle, it can in principle maintain a specific power output as long as fuel is continuously supplied.

One of the more commercially attractive types of fuel cells is the polymer electrolyte membrane (PEM) fuel cell. A single PEM cell consists of an anode and a cathode compartment separated by a thin, ionically conducting membrane. Hydrogen and oxygen (either pure or in air) are supplied to the anode and cathode compartments, respectively. The PEM prevents hydrogen and oxygen from directly mixing, while allowing ionic transport to occur. At the anode, hydrogen is oxidized to produce protons. These protons migrate across the membrane to the cathode and react with oxygen to produce water. The overall electrochemical redox (reduction/oxidation) reaction is spontaneous, thus, energy is released as well. When several "unit" cells are combined in a stack, higher voltages and significant power outputs can be obtained.

The advantages offered by a PEM fuel cell (e.g. its low operating temperature and non-liquid, non-corrosive electrolyte) make it attractive as a potential energy source for transportation and for portable and stationary power applications. Fuel cells have been successfully implemented in a number of utility, aerospace and military applications, but the high cost of fuel cells compared to conventional power generation technologies has deterred their potentially widespread commercial adaptation.

The high costs are primarily due to the catalyzed membrane assembly (CMA) and the bipolar/flow-field plates. The CMA consists of the PEM/conductive backing structure which typically utilizes exotic and expensive materials such as a platinum catalyst. Flow-field plates are commonly graphite or specially coated metal plates that have been machined to contain channels through which gas flow is directed across the plate. A bipolar plate has channels on each side to provide reactants to the anode and cathode of adjacent cells in a stack and may also incorporate some form of cooling channels. Stack manufacturers have historically used high-platinum loaded CMAs and intricately machined graphite bipolar plates, which have made the cost of a fuel cell much too expensive for most commercial applications.

An ideal bipolar plate would be a thin, light-weight, low-cost, durable, highly conductive, corrosion resistant structure that provides an effective flow-field configuration. The conventional flow-field design consists of a number of channels machined into a graphite or metal plate and is configured to provide relatively uniform reactant distribution combined with effective water removal. Until recently, achieving an effective flow-field design has come at the expense of tolerating thick and/or heavy bipolar plates with high material and machining costs.

The most commonly utilized bipolar plate material, graphite, is conductive and corrosion resistant, but it is expensive and not very durable due to its brittleness. Titanium has been used to a lesser extent. Though it is extremely hard and can be treated (e.g., nitrided) to provide adequate conductivity and excellent corrosion resistance, it is prohibitively expensive, heavy, and difficult to machine.

A number of technologies are being considered to replace machined bipolar plates in an effort to lower costs. Two of the more popular approaches considered are (1) the use of composite materials, such as the commercially available Kynar/graphite molded plates, and (2) relatively conventional flowfield/bipolar plate designs using mass production metal fabrication techniques in contrast to the piecewise machining currently being done. At present, these approaches have yielded only small incremental changes in fuel cell costs.

In a departure from conventional flow-field designs and fabrication techniques, U.S. Pat. No. 5,482,792 teaches the use of porous electroconductive collectors to distribute reactants and reaction products and to distribute electrical current to the electrodes. In one embodiment suitable collectors can be metal-wire fabrics or screens, wherein the wires form a series of coils, waves, or crimps, or other undulating contour. The collectors are situated within a gasket frame through which reactants are supplied to (and removed from) the collectors by a series of channels. These channels span the width of the collectors to attempt to evenly distribute reactants and reaction products. The gasket frame, which is made of a castable, elastomeric material (2 mm/0.079 in.) thick, seals against a metal frame, referred to in the patent as the bipolar plate. The bipolar plate separates adjoining cells within a stack and is also used for cooling the cells with which it is in contact. In the preferred configuration, the bipolar plate is made of aluminum and is necessarily thick (5 mm/0.197 in.) in order to adequately withdraw heat generated by the cell. Bipolar plates made of materials with lower thermal conductivities, such as stainless steel, are thinner (3 mm/0.118 in.), but have a more complicated design in order to accommodate extra channels for forced air cooling.

In addition to lowering or eliminating machining costs, another primary objective in bipolar plate design is to minimize thickness. While this may be of secondary importance for stationary power applications, the weight and size of the fuel cell stack has substantial implications in transportation applications. Minimizing bipolar plate thickness lowers stack weight, volume, and cost of materials, with a concomitant increase in the fuel cell power density. Stacks of individual unit fuel cells based on graphite hardware typically have low cell pitches (e.g., 1.6 cells/cm, 4 cells/inch) because the bipolar plates must be sufficiently thick to avoid cracking. Even though the stacks disclosed in U.S. Pat. No. 5,482,792 use metal components, a low pitch is still obtained because of the overall stack configuration.

Accordingly, it is an object of the present invention to provide a simpler and more effective reactant and cooling flow distribution configuration than provided by known bipolar plates.

Another object of the present invention is to provide uniform reactant distribution over a fuel cell membrane without machined bipolar plates.

Yet another object of the present invention is to provide thin, compact, and relatively light-weight cell "cartridges" that are mini-stacks containing two or more individual fuel cells, wherein adjacent cartridges are separated by a cooling plate when combined to form larger stacks.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a polymer electrolyte membrane (PEM) fuel cell having electrodes supplied with a reactant on each side of a catalyzed membrane assembly (CMA). The fuel cell includes a metal mesh defining a flow-field pattern having an inlet confined to a first corner and an outlet confined to a second corner located on a diagonal from the first corner, wherein all flow paths from the inlet to the outlet through the square flow field pattern are equivalent to uniformly distribute the reactant over the CMA.

In a particular characterization of the present invention, a bipolar plate electrically connects adjacent fuel cells, where the bipolar plate includes a thin metal foil having an anode side and a cathode side; a first metal mesh on the anode side of the thin metal foil; and a second metal mesh on the cathode side of the thin metal foil. In another characterization of the present invention, a cooling plate assembly cools adjacent fuel cells, where the cooling plate assembly includes an anode electrode and a cathode electrode formed of thin conducting foils; and a metal mesh flow field therebetween for distributing cooling water flow over the electrodes to remove heat generated by the fuel cells.

The fuel cells of the present invention may also form a fuel cell cartridge. At least two fuel cells are connected with adjacent ones of the fuel cells separated by electrically conductive, thin foil bipolar plates. A first thin foil bipolar plate forms a cathode at a first end of the connected fuel cells and a second thin foil bipolar plate forms an anode at a second end of the connected fuel cells. First and second wire mesh flow fields contact the first and second thin foil bipolar plates, respectively, for removing heat generated by the connected fuel cells.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
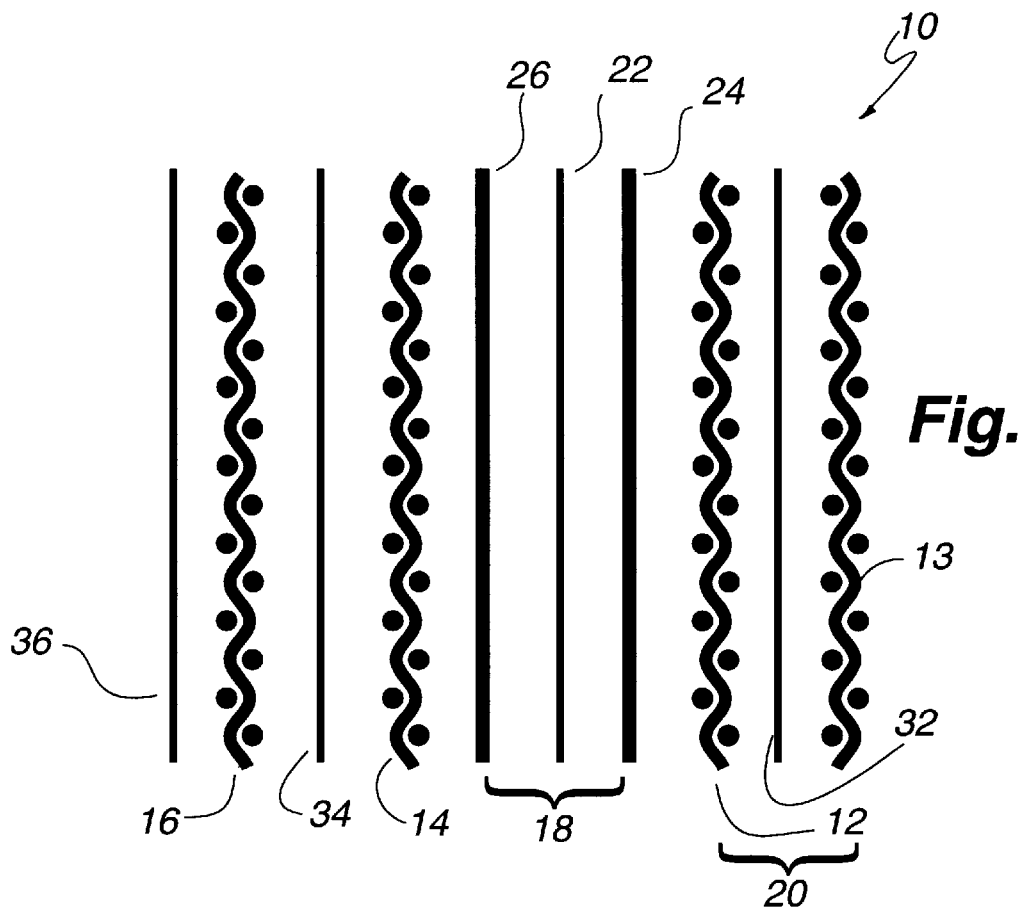
FIG. 1 is a cross-sectional schematic of a fuel cell with a metal screen flow-field in accordance with one embodiment of the present invention.

In accordance with the present invention, fuel cell thickness is reduced by using thin metal or carbon foils in place of conventional bipolar plates. The fuel cell flow-fields are based on wire mesh configurations, which may be simple diagonal path-equivalent patterns formed of various metals including stainless steels for uniform water and reactant distribution over a fuel cell catalyzed membrane assembly (CMA) or bipolar plate surface. FIG. 1 is a cross-sectional schematic of one embodiment of a fuel cell 10 that incorporates woven wire-mesh screens as flow-fields for the reactants and for cooling: anode (hydrogen) flow-field 12, cathode (oxygen or air) flow-field 14, and, optionally, coolant flow-field 16. In one aspect of the invention, bipolar foil 20 is formed by anode flow field 12 of cell 10, cathode flow-field 13 of an adjacent fuel cell, and conducting foil 32. CMA 18 is sandwiched between flow-fields 12 and 14, and includes catalyzed membrane 22 sandwiched between backings 24 and 26, further discussed below. Flow-fields 12, 14, 16 are sandwiched between thin metal foils 32, 34, 36, respectively, to create a thin fuel cell configuration for use in a fuel cell stack, i.e., a series-connected array of fuel cells, to reduce the volume of a fuel cell stack and increase the overall power density.

Major advantages of using simple flow-fields, such as woven wire screens, include the elimination of expensive raw materials costs and machining and/or other special fabrication costs. Many types of screens are readily available in a variety of thicknesses and mesh sizes. An additional benefit of the screens is that they are relatively light-weight in comparison to thick graphite or solid metal plates. Other advantages with metal screens are 1) the screens are not brittle and very thin unit cells may be possible, 2) sheet metal and screen fabrication and die-cutting are "commodity" processes compared to the specialized composite molding processes, and 3) metal screens may permit more effective stack designs in that tolerances can be more precise and unit cells may possibly be thinner than with the molded composites.

Figure 2:
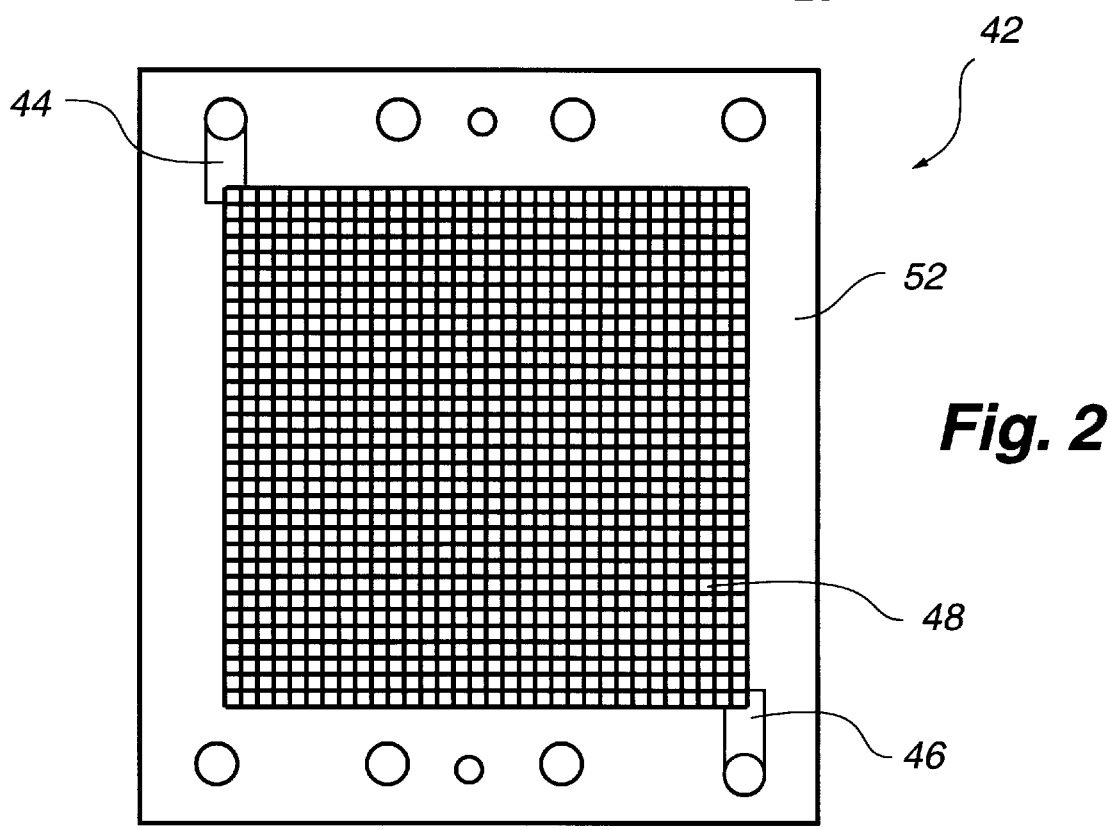
FIG. 2 is a plan view of a metal screen flow-field shown in FIG. 1.

Referring now to FIG. 2, a diagonal path-equivalent flow-field 42 in this invention is configured such that the reactant flow introduction is limited to one corner, e.g., corner 44, and the effluent discharge is limited to the opposing corner, e.g., corner 46. In one embodiment using a wire screen, wire screen 48 is oriented such that the wires of the weave are parallel to the edges of the screen, which is sealed around the periphery with gasket 52 except for the opposing manifolded corners.

Figure 3:
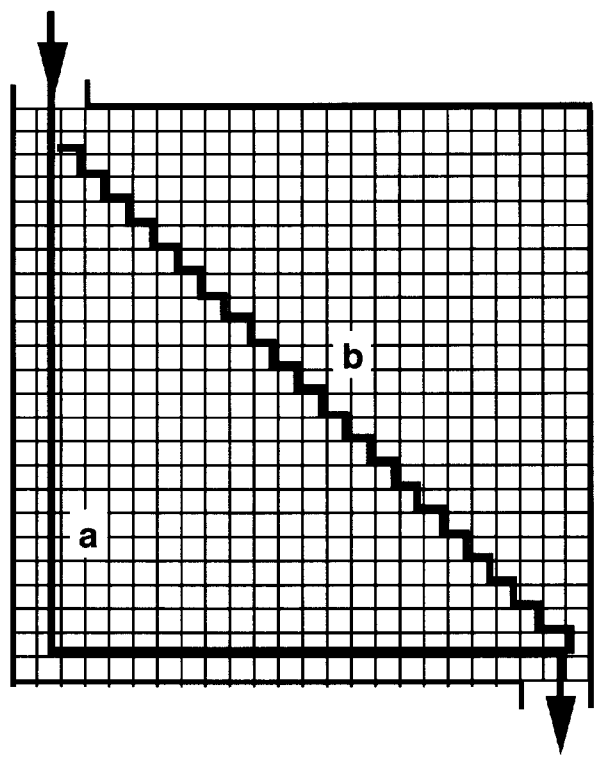
FIG. 3 is a schematic illustration of flow distribution over a metal screen flow-field

In the over-and-under weave of a simple square weave mesh wire screen shown in FIG. 3, flow between the small box regions defined by the interwoven wires can only be between elements with common sides. The two wires stacked on one another that define a corner of an element prevents flow between diagonal elements in the interweave sections. Thus, if one considers the simple schematic in FIG. 3, the flow can only be in the (x) or (y) directions through the weaves of the screen.

Two possible flow-paths are shown in FIG. 3. Path (a) proceeds straight in the (−y) direction and then straight in the (+x) to the exit while closely passing by the distant lower-left corner. Path (b) proceeds along the diagonal, but because of the x-y flow preference, the flow follows a staircase-like path. Once the total length of all the individual segments in the staircase are summed, the lengths of paths a) and b) are identical. Therefore, the flow rate along each path should be equivalent. In practice, the flow is suprisingly uniformly distributed throughout the entire flow-field and there are no dead spots in the far corners as may be intuitively expected.

The flow configuration shown in FIG. 3 was confirmed by the use of a wire screen square flow-field mock-up in a transparent plastic housing to observe the reactant flow distribution and water accumulation in a simulated cathode flow-field. Air was introduced at 3 atm pressure at a flowrate equivalent to 1 A/cm$^2$ at 50% oxygen utilization and humidified above the saturation point within the cell to replicate two-phase flow conditions. The water vapor would fog the cool surface of the housing. Condensed water droplets passing through the flow-field would wet the wall and clear the surface until it had a chance to fog again. It was thus possible to observe the condensed water streamlines. The patterns formed by the streamlines demonstrated that the flow was uniformly distributed over the entire flow field, even to the distant corners. Water removal was effective and there were minimal and only temporary accumulations within the flow-field.

As contemplated by the present invention, the shape of the flow-field is not limited to a square. Rectangles based on square or rectangular meshes also provide equivalent flow-paths with corner-to-corner flow. In addition, the corner-to-corner elements can be a building block to larger arrays. For example, the active area of a cell could be n elements wide. Two inlets could be positioned at 1n and 3n along the top edge, and the three outlets could be placed at 0n, 2n, and 4n along the bottom. Each nth element is then supplied with corner-to-corner flow. The manifold penetrations for the flow-field for the opposing electrode (or the flow-field on the backside of the plate) would then occupy the off-corners to the first flow-field. A two-dimensional extension of this concept would result in arrays in both directions with manifold penetrations in the active area that each supply (or receive) flow to four corner-to-corner elements oriented around it.

Figure 4:
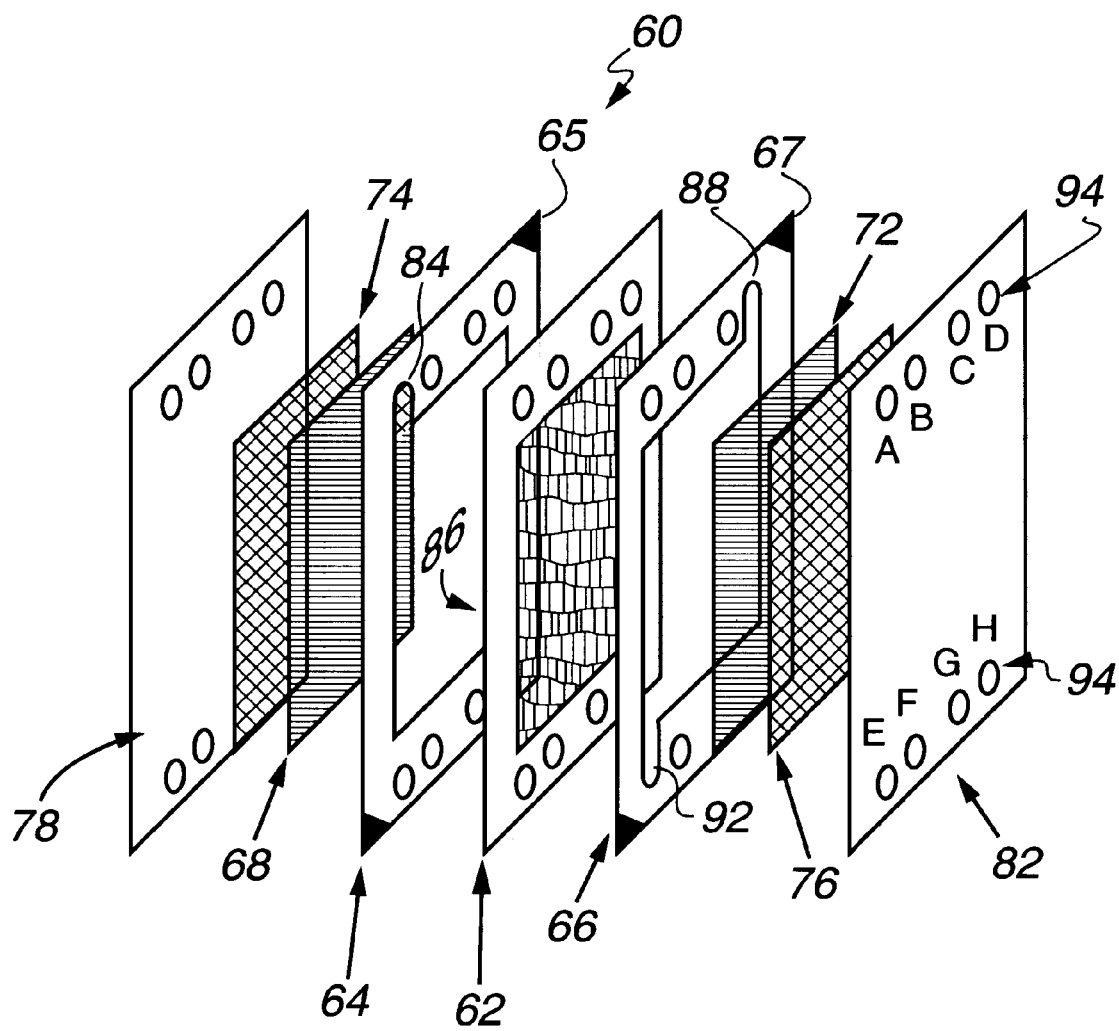
FIG. 4 is an exploded view of a fuel cell according to one embodiment of the present invention.

An advantage of using corner-to-corner flow in an internally manifolded fuel cell stack 60, shown in FIG. 4, is in the simplicity and compactness of the manifold to flow-field transition. Since the two different sets of opposing corners, e.g., 84 and 86 in gasket 64 and 88 and 92 in gasket 66, can be used for the anode and cathode reactant flows, a simple channel connecting a manifold penetration to each corner is all that is needed, as is shown in FIG. 4. In one embodiment, slots 84/86 and 88/92 are cut in gaskets 64 and 66, respectively to define the flow routes. In another embodiment, the gaskets are replaced by thin, rigid plastic frames coated with adhesive for sealing. Large distribution channels, as typically used with numerous small, parallel channels or with "porous" flow-fields are not required, which simplifies the configuration and allows more of the footprint to be active electrode area.

Another, more subtle, advantage lies in the nature of the flow dynamics. With corner-to-corner flow across wire-screens 68, 72, 74, and 76, the relative space velocity of the reactants is much greater at the entrance and exit. When operating the cathode on air (or the anode on a dilute hydrogen stream), this acts to increase the uniformity of the current distribution over conductive backings 112, 114 (FIG. 5) compared to a more conventional set-up with a constant space velocity in all areas (neglecting reactant consumption).

Figure 5:
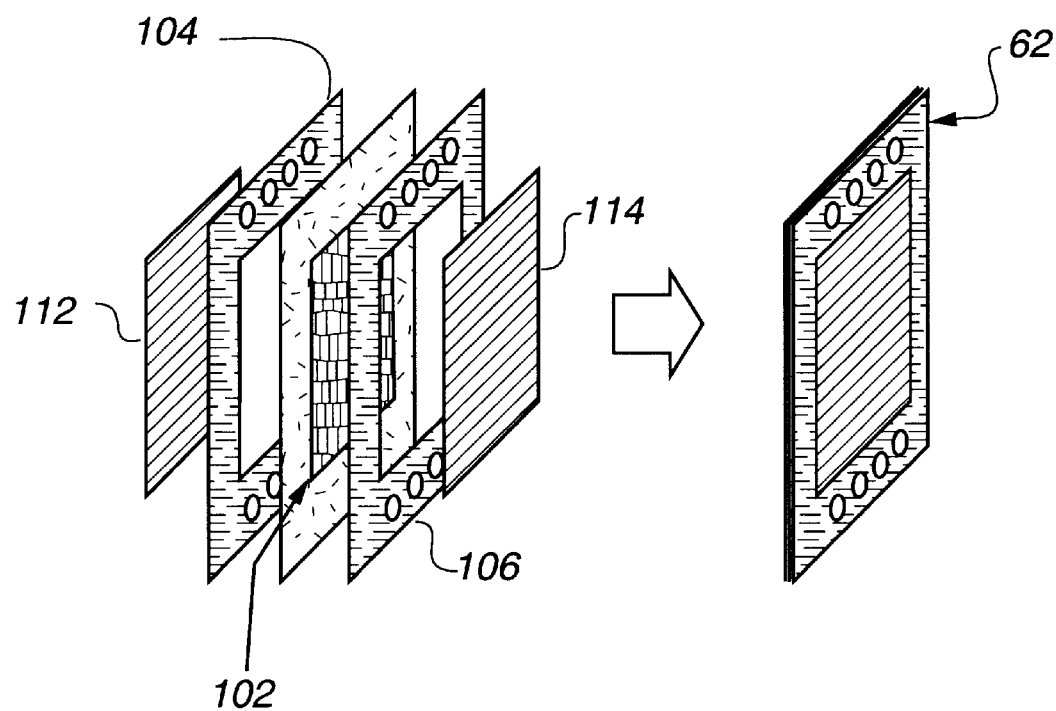
FIG. 5 is an exploded schematic of an exemplary catalyzed membrane assembly used in the fuel cell shown in FIG. 1.

In order to maintain the integrity of the catalyzed membrane assembly 62 during assembly and sealing, it is another feature of the present invention to form the CMA shown in FIG. 5 as a rigid frame with conductive, gas diffusion backings 112, 114 pressed against opposed surfaces of membrane 102. In an exemplary embodiment, the periphery of membrane 102 around the active area is sandwiched between two 0.254 mm/0.010 in. thick SS sheets 104, 106 cut into the appropriate configuration. Industrial strength adhesive (0.051 mm/0.002 in. thick) is first applied to SS sheets 104, 106 and the components are bonded together under pressure. Membrane 102 is then trapped in a structure that is easily handled and does not change dimensions. This simplifies assembly and part reproducibility. The picture frame assembly can be pretested for the integrity of membrane 102 (e.g. no gas cross-over). The stiffness of the structure prevents membrane 102 from falling into the channels cut into gaskets 64, 66 (FIG. 4) to connect manifolds 94A, D, E, H (FIG. 4) to the flow-field (e.g., channels 84/88, 92/86, in FIG. 4) which would cause leakage of the reactants in the gap thus formed opposite of the channel.

In another embodiment, a thin, rigid plastic frame combines the gasket and stainless steel picture frame (e.g., frame 106 and gasket 66). The plastic frame, which is made of polysulfone, is coated on both sides with a high bond adhesive (0.051 mm/0.002 in. thick), and resembles frame 106 in that it traps the CMA in a rigid structure. However, because a separate gasket 66 is no longer required, the plastic frame must provide reactant access from the manifold hole to the flow-field. Channels corresponding to, e.g., slots 88, 92 in gasket 66, are formed as grooves from the opposing corner manifold holes to the open active area in the gasket side of the combined frame. The gasket side of the frame contains the flow-field hardware and is adhered directly to the conducting metal foil, e.g., foil 82. The other side of the frame is smooth (no grooves) and is adhered to membrane 102 (FIG. 5).

In an exemplary embodiment, CMA 62 (FIG. 5), which is situated between the anode 68, 74 and cathode 72, 76 screens shown in FIG. 4, consists of a 100 cm$^2$ active area catalyzed Nafion™ membrane (Nafion 112 from DuPont) and two E-TEK carbon cloth backings 112, 114 (each about 0.457 mm 0.018 in. thick, 100 cm$^2$). To give the CMA physical stability, membrane 102 is enclosed within a thin metal "picture frame" (FIG. 5). A high-bond adhesive is applied to one side of each of frames 104, 106 (stainless steel foil, 0.254 mm/0.010 in. thick each). These frames are die-cut to form penetrations for the manifolds (FIG. 4, 94A–H) and the window for the active area of membrane 102. The ionomeric membrane is sandwiched between the two adhesive-coated sides of the frames and the assembly is pressed together. Membrane 102 is trimmed from the manifold holes using standard cork borers. Carbon cloth backings 112, 114 are then pre-pressed to the membrane at ambient temperature and approximately 1.2 atm of pressure. The finished product of CMA 62 (and backings) encased within a rigid frame assures proper alignment of CMA 62 within the cell and enhances sealing.

Referring again to FIG. 4, unit cell 60 is built around the picture frame CMA 62. In a preferred embodiment, the wire-screen flow-fields on either side each consist of two metal screens 68, 74 and 72, 76 (each 10×10 cm) that sit within a gasket "frame" 64, 66, respectively, that is applied to a metal foil 78, 82, respectively. Relatively coarse screens 74, 76 (24×24 mesh, 0.356 mm/0.014" in. diameter wire) serve as the main gas flow-fields and are placed directly against foils 78, 82. A fine screen 68, 72 (60×60 mesh, 0.191 mm/0.0075" in. diameter wire), is laid on top of each coarse screen 74, 76 flow-field. Fine screens 68, 72 serve as a physical barrier between coarse screens 74, 76 and carbon cloth backings 112, 114 (FIG. 5) of CMA 62, which is located between the anode and cathode flow-fields. The tight weave of fine screens 68, 72 acts to keep carbon cloth backings 112, 114 of CMA 62 from "falling" into the open weave of coarse screens 74, 76, but still allows reactant and water vapor to reach the CMA.

In practice, however, a fine screen can collect water over time. The square openings formed by the tight weave act as hydrophilic "cages," trapping water and decreasing reactant access to the CMA. This problem has been overcome by providing a hydrophobic coating on the fine screens prior to use to prevent water from collecting in the openings. In one embodiment, the fine screens were pretreated with a mixture of carbon black and Teflon.

If a relatively soft material is used for conductive backings 112, 114 without fine screens 68, 72 in place, the backing becomes embedded in the coarse screen, resulting in relatively high pressure drops and cell resistance result. An exemplary effect of the fine screens is shown in Table A.

TABLE A

| Fine Screen | Presure Drop psi | Cell Resistance $\Omega\text{-cm}^2$ |
| --- | --- | --- |
| Without | 6 | >0.5 |
| With | 2 | 0.15 |

Additionally, thin, flattened expanded metal mesh and perforated plates can and have been utilized in place of the fine screen. Perforated plates in particular appear to provide an advantage to fine screens in terms of water management within the cell. By design, a perforated plate can have larger "openings" and "islands" that more nearly replicate the configuration obtained with conventional channeled flow-fields and still provide adequate reactant access to the CMA, protect the backing from blocking the coarse screen, and yet be very thin. The coarse screen continues to serve as the flow field for water distribution. Because a thin perforated plate with large openings does not tend to trap water (such as the fine weave screen does), it is not necessary to hydrophobize the structure. Perforated plates have been made of 316 stainless steel (SS), with a thickness of only 0.127 mm/0.005 in. and with penetrations of 1.016 mm/0.040 inches diameter on a 1.53 mm/0.060 in. stagger.

It is a particular feature of this invention to use thin metal foil separators 78, 82 (0.254 mm/0.010 in. thick in this embodiment) adjacent flow-field screens 68/74 and 72/76, respectively to be used in a bipolar configuration. As shown in FIG. 1, in a stack of unit cells 10, the set of screens 12 on one side of foil 32 would be the anode flow-field for one cell, whereas screens 13 on the other side of foil 32 would be the cathode flow-field for the neighboring cell. The assembly of screens 12 and 13 with foil 32 forms a novel bipolar configuration with screen flow-fields. The metal screens provide some structural support and eliminate the need for machining of the metal separator plates so that thin foils may be used. As used herein, the term "thin" means metal foils having a preferred thickness less than about 0.508 mm/0.200 in. in order to minimize the composite thickness of a unit cell 60 (FIG. 4).

As shown in FIG. 1, cooling may be provided by sandwiching two of the metal foil separators 34, 36 around a cooling flow-field 16, and the anode and cathode flow-fields then sandwich the foil separators. Either of the remaining sets of manifold penetrations, e.g., manifold penetrations 94B/G or 94C/F (FIG. 4) can be used for the coolant. As with the reactant flows, a channel is formed in the gaskets adhered to plates 34 and 36 (FIG. 1) to connect the manifold to the coolant flow-field. This flow-field may be a wire screen or a serpentine channel cut into a compressible, electronically conductive material such as graphite gaskets (e.g. Grafoil from Union Carbide). FIG. 1 shows cooling flow field 16 adjacent cathode 34, but the cooling flow field could also be adjacent anode 32.

Channels 84, 86 and 88, 92 (FIG. 4) for the corner-to-corner flow are cut directly into gasket frames 64 and 66, respectively. The gaskets are made of 1.524 mm/0.060 in. thick fabric-reinforced silicone tape. The silicone is a closed-cell foam, which can be easily compressed to provide a gas-tight seal, yet not require excessive force to accomplish an effective seal. This supplies substantial leeway in matching the seal thickness with the thickness of the compressed cell. The compression of the cell may be controlled by introducing rigid "tabs", e.g., tabs 65 and 67, of the appropriate thickness located at the beveled outer corners of the gasket frame to control the compression of the cell. As such, the gasket can be compressed to no less than the thickness of the tabs, which assures uniform compression across each cell. This is important in a stack, because each cell must be pressed to the same degree to assure equal distribution of reactant flow and uniformity of cell performances. In the embodiment in which a rigid plastic frame replaces the gasket/stainless steel picture frame, tabs are unnecessary because the frame itself serves to control compression of the cell contents.

The unit cell 60 depicted in FIG. 4 is approximately 3 mm/0.118 in. thick, providing for a thin, compact design in which the active area comprises about 60% of the total area encompassed by the metal foils and frames. Because the individual cell components are adhered together between metal foils, the resulting structure is a one-piece unit that is referred to herein as a "cartridge." A cartridge can contain one or several cells that share separator foils as well as cooling plates. However, there are advantages to retaining the cooling plate as a separate structure.

Figure 6:
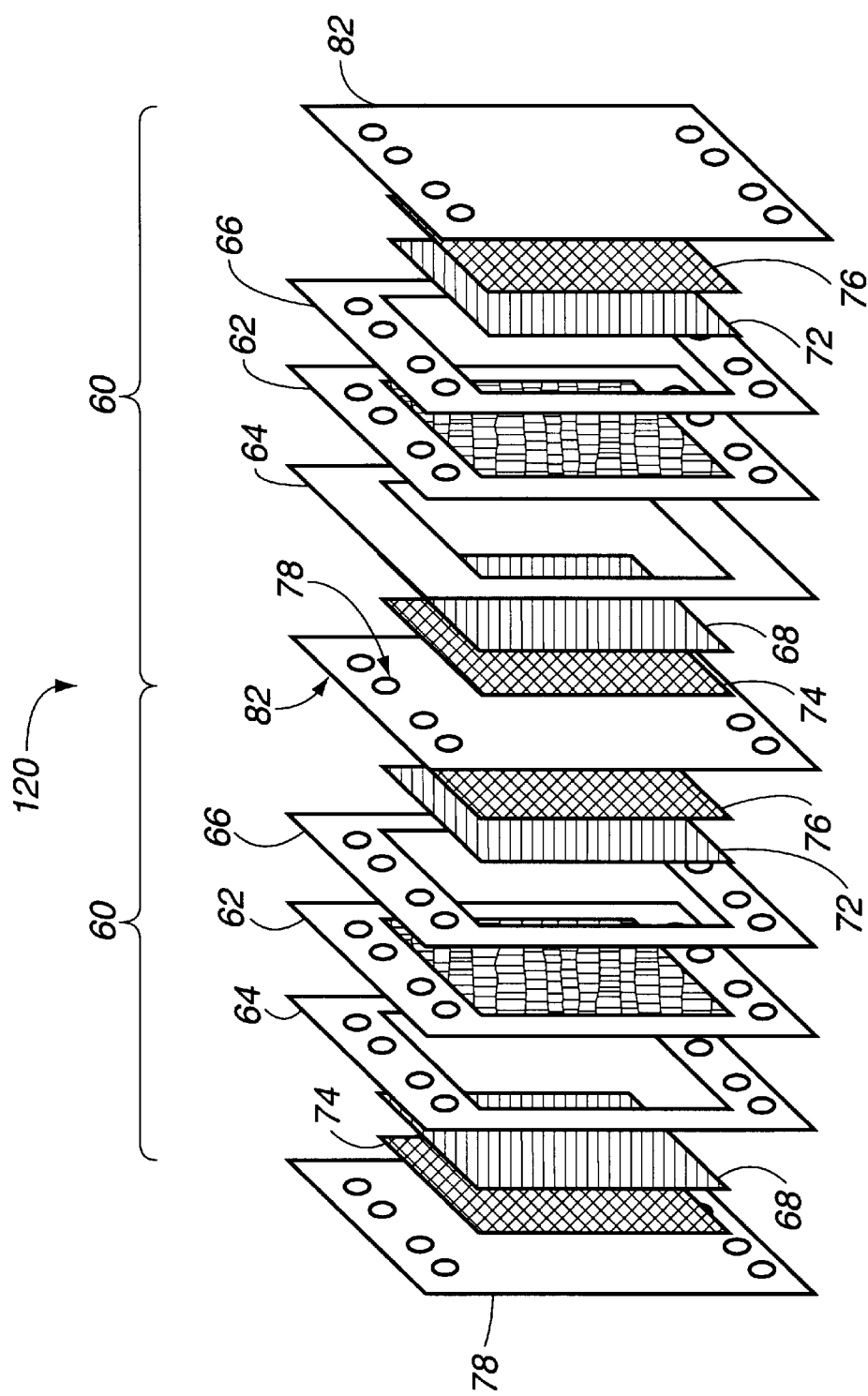
FIG. 6 is an exploded view of a fuel cell cartridge according to one aspect of the present invention, where the cartridge is formed from two unit cells.

In an exemplary structure shown in FIG. 6, cartridges are formed of two cells 60. Larger stacks are assembled by combining cartridges together with removable cooling plates that separate the units, as further shown in FIG. 7.

An exemplary cartridge 120 is formed from two unit cells 60 that are connected in series at bipolar plates 78/82, which are thin metal foils. More than two unit cells may be connected, as shown in FIG. 6, if cooling considerations permit. It will be understood that the components of unit cell 60 correspond to like-numbered components in FIG. 4 and are not discussed separately with respect to FIG. 6.

Figure 7:
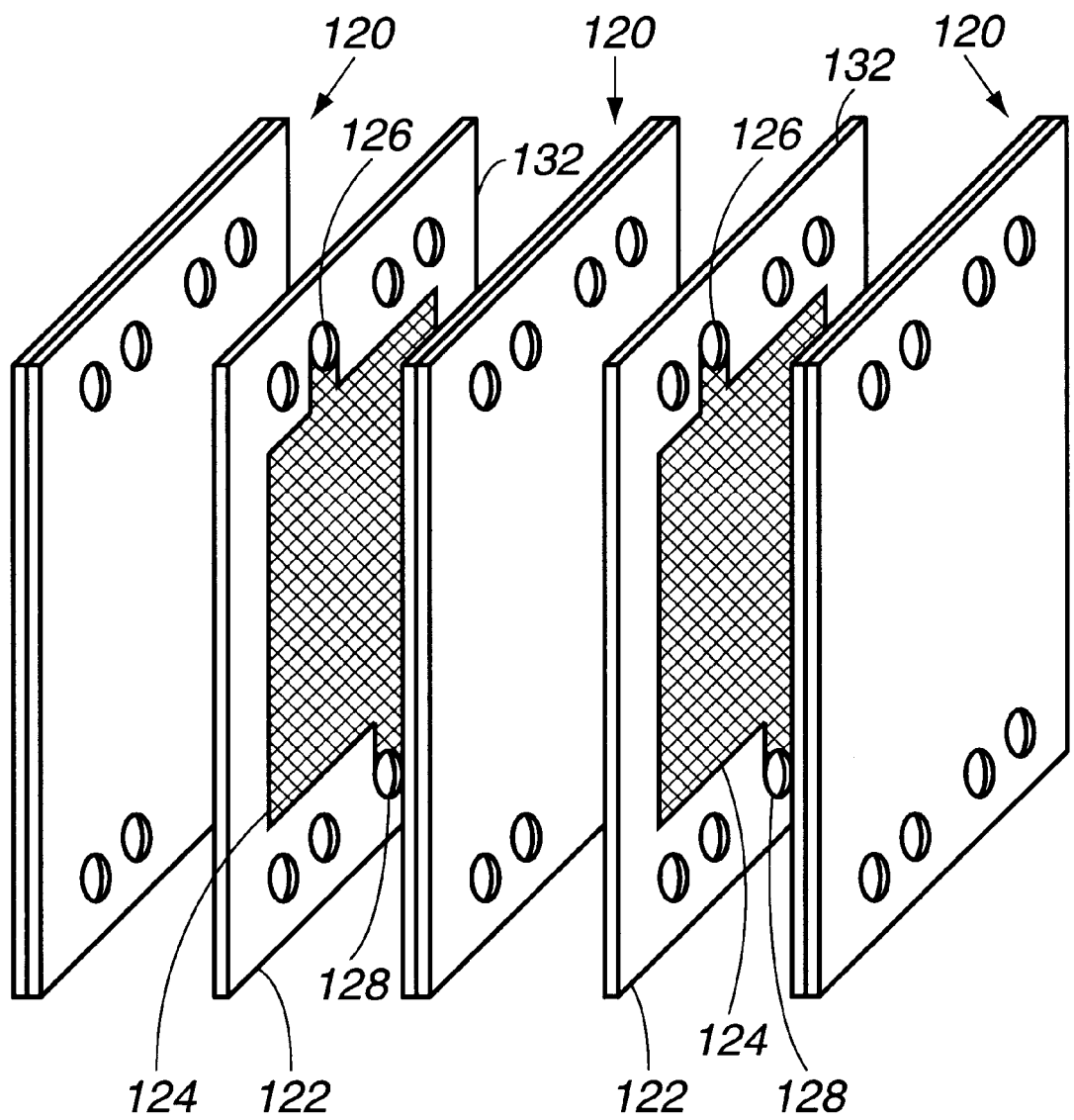
FIG. 7 is an exploded view of an assembly of cartridges, where adjacent cartridges are separated by removable cooling plates.

In a particular feature of the present invention, FIG. 7 depicts cooling plates 126 between adjacent cartridges 120. Cooling plates 126 include wire screens 124 that are held in a frame assembly 132, that may also serve to electrically connect adjacent cartridges 120 in series, if desired. Cooling flow is input/output through manifold openings 126/128 and is evenly distributed over wire screen 124, as discussed above. Wire screens 124 may be simply woven mesh screens, but may be any suitable screen that provides fluid communication through the cooling volume between adjacent fuel cells.

In a test configuration, a cartridge is fixtured between gold-plated copper current collector plates, which in turn are placed between and electrically isolated from aluminum end-plates that incorporate fittings to supply the internal manifolds. Tie-bolts connecting the two endplates provide mechanical compression of the unit cells.

In summary, the use of flow connections to opposing corners of a square mesh wire screen or other flow-field material provides a configuration such that the effective lengths of all possible paths (that incrementally advance towards the outlet) are equivalent. Not only does such a scheme appear to be effective, but it greatly simplifies the configuration of the manifolding around the periphery in that it allows the fuel and oxidant reactant manifold penetrations to occupy the two sets of opposing corners and not overlap or interfere with one another.

The picture frame packaging of the CMA allows effective sealing when used with the wire screen flow-fields. A picture frame configuration has advantages even with conventional hardware because of the improved sealing surfaces and dimensional stability of the structure from the points of view of testing, handling, and assembly.

Additionally, the overall packaging of individual fuel cells into cartridges enables the quick and easy assembly of stacks and also makes it possible to remove and replace problem cells within a stack without compromising the remaining cells. Because the cartridges are relatively thin, high power density stacks are possible that are relatively small, compact, and light-weight.

Figure 8:
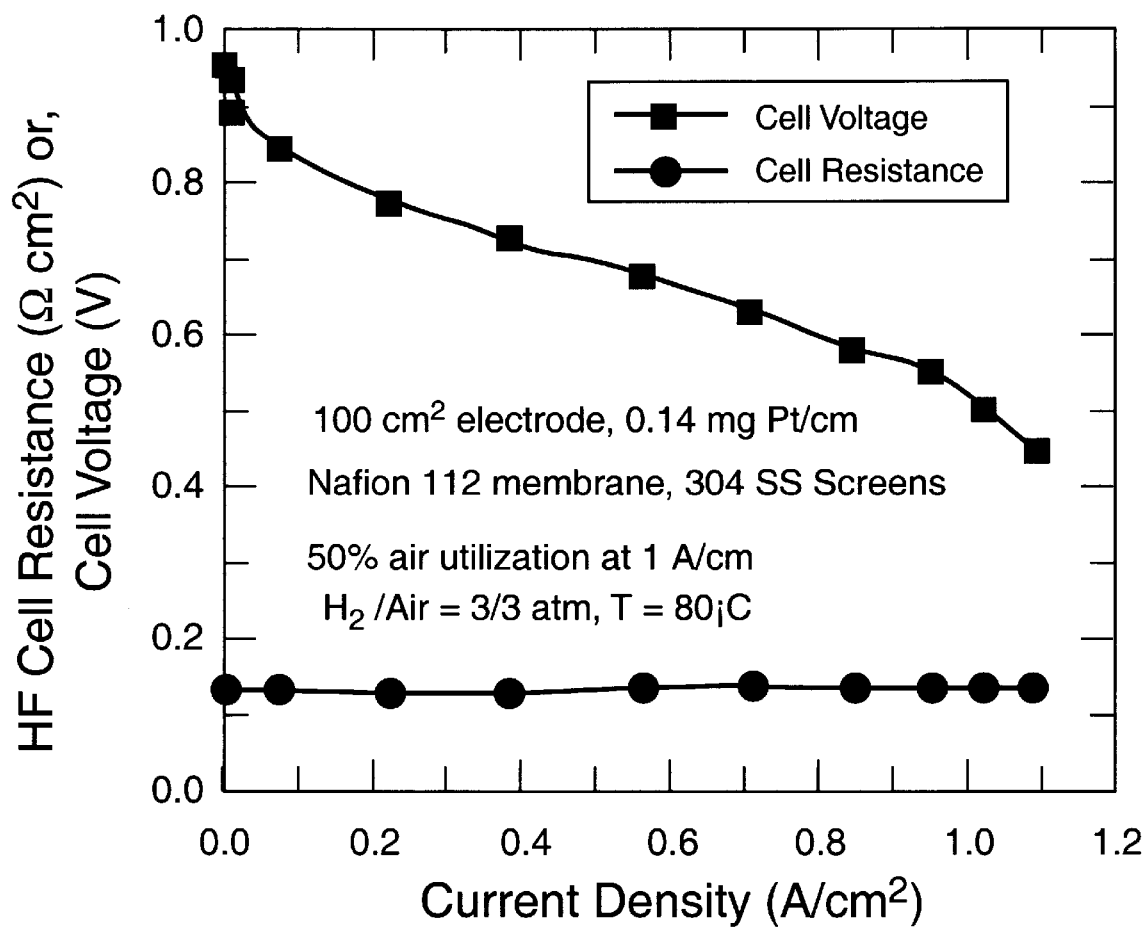
FIG. 8 graphically depicts performance characteristics of a fuel cell using a stainless steel screen flow-field and metal foil separator plates.

A polarization curve for a 100 cm$^2$ single cell assembled as described above is shown in FIG. 8 operating on humidified, pressurized H$_2$/air (3/3 atm, 50% air utilization at 1 A/cm$^2$). The CMA used in the picture frame consisted of a Nafion 112 membrane with low platinum loading catalyst layers (0.14 mg Pt/cm$^2$/electrode). The high frequency cell resistance was less than 0.15 Ωcm$^2$, which is high compared to small cells, but not unreasonable considering the numerous components and interfaces involved and the size of the active area. In any case, the cell provided about 0.5 W/cm$^2$ at 0.62 V (50% LHV voltage efficiency).

Cells with 304 SS wire screens and foils demonstrated loss of component conductivity with cell operation. The use of 316 SS instead of the 304 improves the stability of the metal structures. Thus, a cell was assembled using 316 SS components that were not surface treated beyond washing with soap and water to remove surface grime and then swiped with an organic solvent such as isopropanol or acetone to remove any last traces of grease or soap, or the like.

One such cell was operated for 2,000 h at a constant voltage of 0.5 V. Operating temperatures ranged from 70–80° C. for the cell itself, 90–110° C. for the hydrogen gas humidifier, and 70–80° C. for air humidification. Both the hydrogen and air gas streams were pressurized at 3 atm, and flow rates were maintained at approximately 2 and 4 L/min., respectively. These flows roughly correspond to 2× the stoichiometric amount of flow required to operate the cell at 1 A/cm$^2$. The cell was not internally cooled, instead it was air-cooled by an external fan.

The long term performance of the cell was monitored in a number of ways: by measuring voltage drops across the cell components, measuring high frequency resistance (HFR), and by periodically obtaining polarization curves. The stability of the metal hardware was quantified using voltage leads connected to the various metal components. With the cell set to operate at a fixed current, the voltage drops were measured between the various components, which allows the calculation of the contribution of the metal components to the cell resistance.

Figure 9:
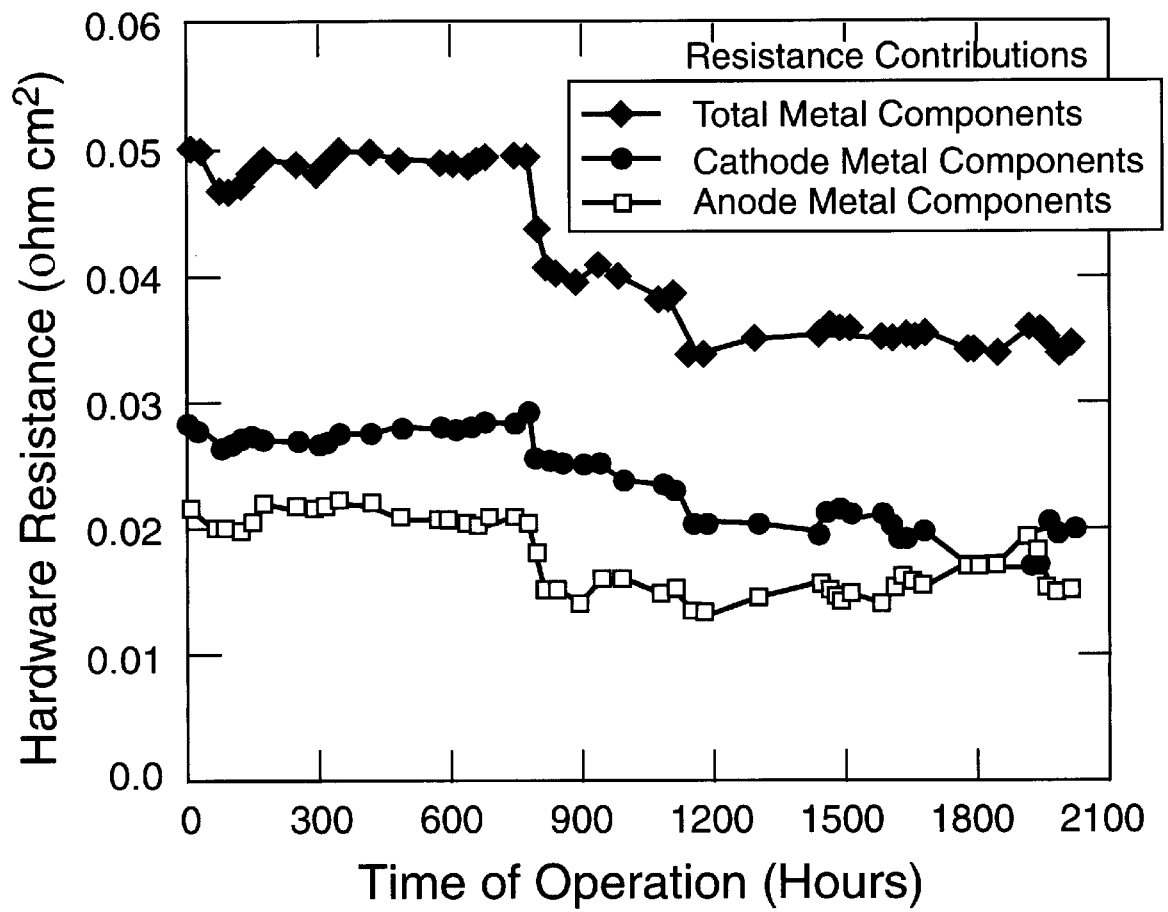
FIG. 9 graphically depicts fuel cell resistance as a function of cell operating hours for the cell configuration shown in FIG. 1.
Figure 10:
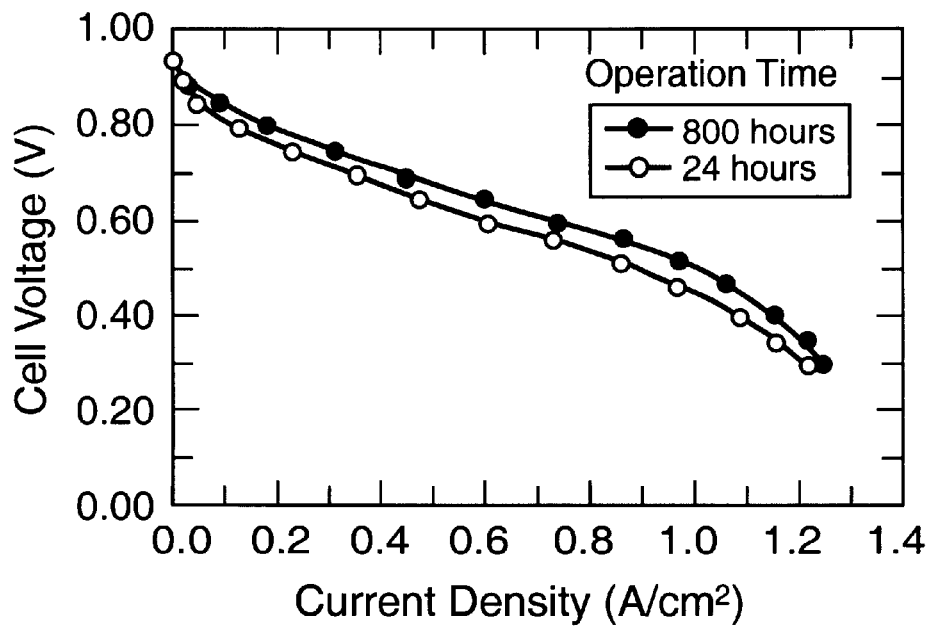
FIG. 10 graphically depicts fuel cell operating parameters after 24 hours and 800 hours of operation.

The 2,000 hour results are shown in FIG. 9. The anode and cathode metal component contributions in this figure consist of the resistances of the components and interfaces between the fine screens (positioned against the CMAs) and their respective current collector plates. Thus the current traverses 1) the SS fine screen, 2) the SS flow-field screen, 3) an SS separator plate, and 4) the gold-coated current collector plate, which is a total of four components and three interfaces. Also shown in this figure is the total contribution of the metal hardware, calculated from the measured voltage difference between the fine wire sense leads and the current collector plates at a fixed current. The curves in FIG. 9 demonstrate that the contribution of the metal hardware is relatively stable. The exception to this conclusion occurred at about 800 hours when the tie-bolts holding the cell together were re-tightened, which brought the components together more forcefully and substantially improved the conductivity across the interfaces. The improvement in cell performance realized upon the tightening of the tie-bolts is demonstrated in FIG. 10. From the improvement in the low-current density region of the curves, it is evident that the performance was due to realizing more effective electrode performance rather than to the decrease in component resistance alone.

Figure 11:
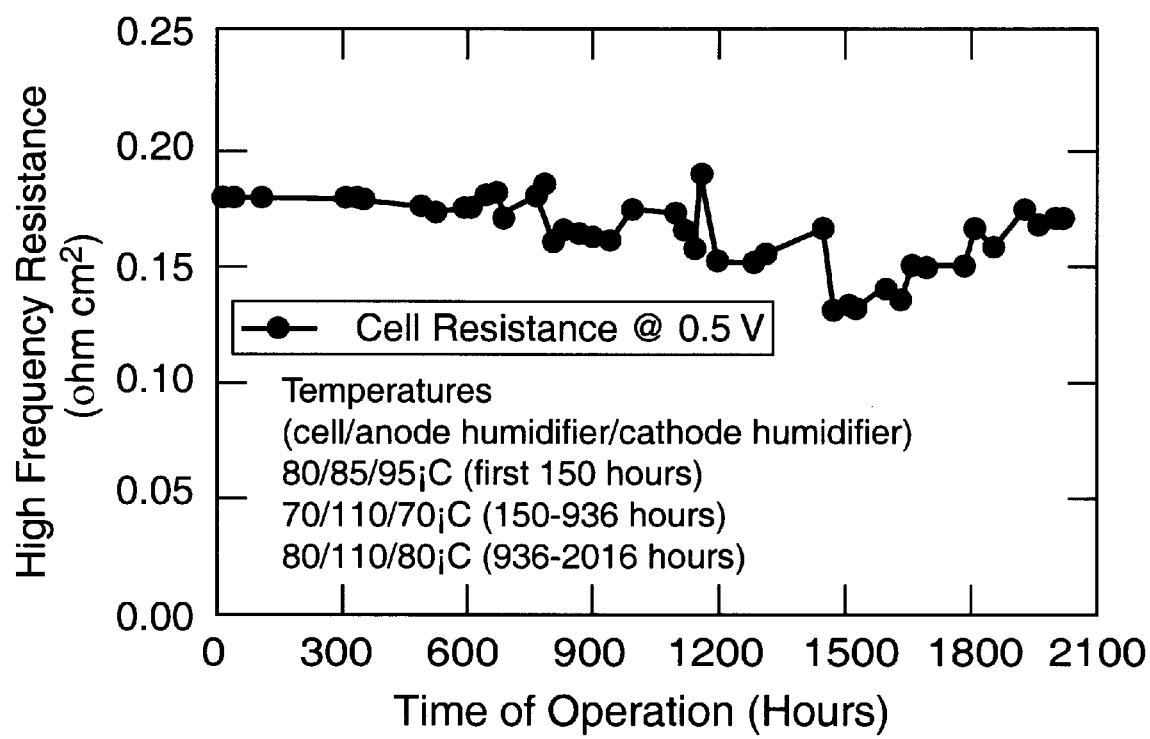
FIG. 11 graphically depicts fuel cell resistance over 2000 hours of operation.

If the stainless steel was corroding or passivating, the voltage measurements across the screens would tend to increase over time. This was not observed in FIG. 9, which suggests either that corrosion was minimal or that the corrosion products were soluble. In the latter case, dissolution of the metal hardware would liberate polyvalent ions that could conceivably enter into the polymer electrolyte membrane and tie up active sites, adversely affecting the protonic conductivity of the ionomer. To some extent, this can be monitored by high frequency resistance (HFR), as it is a diagnostic tool in determining the condition of the CMA. As observed in FIG. 11, the final HFR did not increase over the initial value, although it did fluctuate with time. However, the HFR is susceptible to the hydration state of the membrane. Thus it is difficult to quantify any possible decrease in the conductivity due to the inclusion of metal ions, but the figure suggests that this is not occurring to any appreciable extent, if at all.

In any event, the 316 SS hardware was clearly superior to the 304 SS in terms of long term stability. After disassembly of the 2,000 hour 316 SS cell, no visible corrosion of the metal components was apparent. Perhaps even better results may be obtained with 316L SS because of its lower carbon content and corresponding corrosion susceptibility. These results are very promising because the use of a relatively low-cost metal alloy without the need for any special surface treatments or coatings provides a very low-cost fuel cell stack technology.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a PEM fuel cell stack, a bipolar plate for electrically connecting adjacent fuel cells, said bipolar plate comprising:

a thin metal foil having an anode side and a cathode side;

a first metal mesh on said anode side of said thin metal foil; and a second metal mesh on said cathode side of said thin metal foil.

2. A bipolar plate according to claim 1, wherein said thin metal foil has a thickness less than about 0.508 mm/0.020 in.

3. A bipolar plate according to claim 2, wherein said thin metal foil has a thickness of about 0.254 mm/0.010 inc.

* * * * *